(12) United States Patent
Airoldi

(10) Patent No.: US 11,111,905 B2
(45) Date of Patent: Sep. 7, 2021

(54) WIND TURBINE AND A METHOD FOR OPERATING A WIND TURBINE

(71) Applicant: Siemens Gamesa Renewable Energy A/S, Brande (DK)

(72) Inventor: Giovanni Airoldi, BG Eindhoven (NL)

(73) Assignee: SIEMENS GAMESA RENEWABLE ENERGY A/S, Brande (DK)

(*) Notice: Subject to any disclaimer, the term of this patent is extended or adjusted under 35 U.S.C. 154(b) by 71 days.

(21) Appl. No.: 16/451,043

(22) Filed: Jun. 25, 2019

(65) Prior Publication Data
US 2020/0011303 A1   Jan. 9, 2020

(30) Foreign Application Priority Data

Jul. 3, 2018   (EP) .................................... 18181439

(51) Int. Cl.
| | |
|---|---|
| *F03D 80/60* | (2016.01) |
| *F03D 9/25* | (2016.01) |
| *F03D 80/80* | (2016.01) |
| *F25B 25/00* | (2006.01) |
| *F25B 49/02* | (2006.01) |

(52) U.S. Cl.
CPC .............. *F03D 80/60* (2016.05); *F03D 9/25* (2016.05); *F03D 80/80* (2016.05); *F25B 25/005* (2013.01); *F25B 49/02* (2013.01); *F05B 2260/20* (2013.01); *F05B 2270/303* (2013.01)

(58) Field of Classification Search
CPC .......... F03D 80/60; F03D 80/80; F25B 49/02; F25B 49/005; F05B 2260/20; F05B 2270/303
See application file for complete search history.

(56) References Cited

U.S. PATENT DOCUMENTS

| | | | | |
|---|---|---|---|---|
| 8,082,748 | B2 * | 12/2011 | Matsuo | F03D 9/28 62/236 |
| 8,601,804 | B2 * | 12/2013 | Akashi | F03D 9/25 60/398 |
| 8,961,130 | B2 * | 2/2015 | Sabhapathy | F03D 80/60 416/1 |
| 8,992,171 | B2 * | 3/2015 | Sabhapathy | F03D 80/60 415/178 |

(Continued)

FOREIGN PATENT DOCUMENTS

| | | | | |
|---|---|---|---|---|
| CA | 2775534 A1 * | 11/2012 | | F16C 37/007 |
| CN | 101392729 A | 3/2009 | | |

(Continued)

OTHER PUBLICATIONS

European Search Report dated Jan. 14, 2019 for Application No. 18181439.3.

*Primary Examiner* — Justin D Seabe
*Assistant Examiner* — Ryan C Clark
(74) *Attorney, Agent, or Firm* — Schmeiser, Olsen & Watts LLP

(57) ABSTRACT

Provided is a wind turbine including a nacelle and a cooling circuit, wherein the cooling circuit includes at least one internal cooling device within the nacelle and at least one external cooling device outside of the nacelle, wherein a heat exchanging device coupling the cooling circuit with a second cooling circuit is provided, wherein the second cooling circuit includes a further external cooling device outside of the nacelle.

10 Claims, 1 Drawing Sheet

(56) References Cited

U.S. PATENT DOCUMENTS

| | | | |
|---|---|---|---|
| 2010/0034653 A1* | 2/2010 | Frokjaer | F03D 80/60 |
| | | | 416/39 |
| 2010/0150704 A1 | 6/2010 | Grevsen et al. | |
| 2012/0124984 A1 | 5/2012 | Akashi et al. | |
| 2012/0133152 A1 | 5/2012 | Wagoner | |
| 2013/0229017 A1* | 9/2013 | Tobinaga | F03D 9/25 |
| | | | 290/55 |
| 2017/0370349 A1* | 12/2017 | Ritter | F03D 80/80 |

FOREIGN PATENT DOCUMENTS

| | | | |
|---|---|---|---|
| CN | 101761453 A | 6/2010 | |
| CN | 102859188 A | 1/2013 | |
| CN | 204179833 U | 2/2015 | |
| CN | 205001129 U | 1/2016 | |
| CN | 205207057 U | 5/2016 | |
| CN | 105927482 A | 9/2016 | |
| CN | 105927484 A | 9/2016 | |
| CN | 206555080 U | 10/2017 | |
| DE | 102007042338 A1 | 3/2009 | |
| EP | 2320081 A2 | 5/2011 | |
| EP | 2466128 A1 | 6/2012 | |
| EP | 2565446 A2 | 3/2013 | |
| EP | 2796712 A1 | 10/2014 | |
| EP | 3636917 A1 * | 4/2020 | F03D 80/60 |

\* cited by examiner

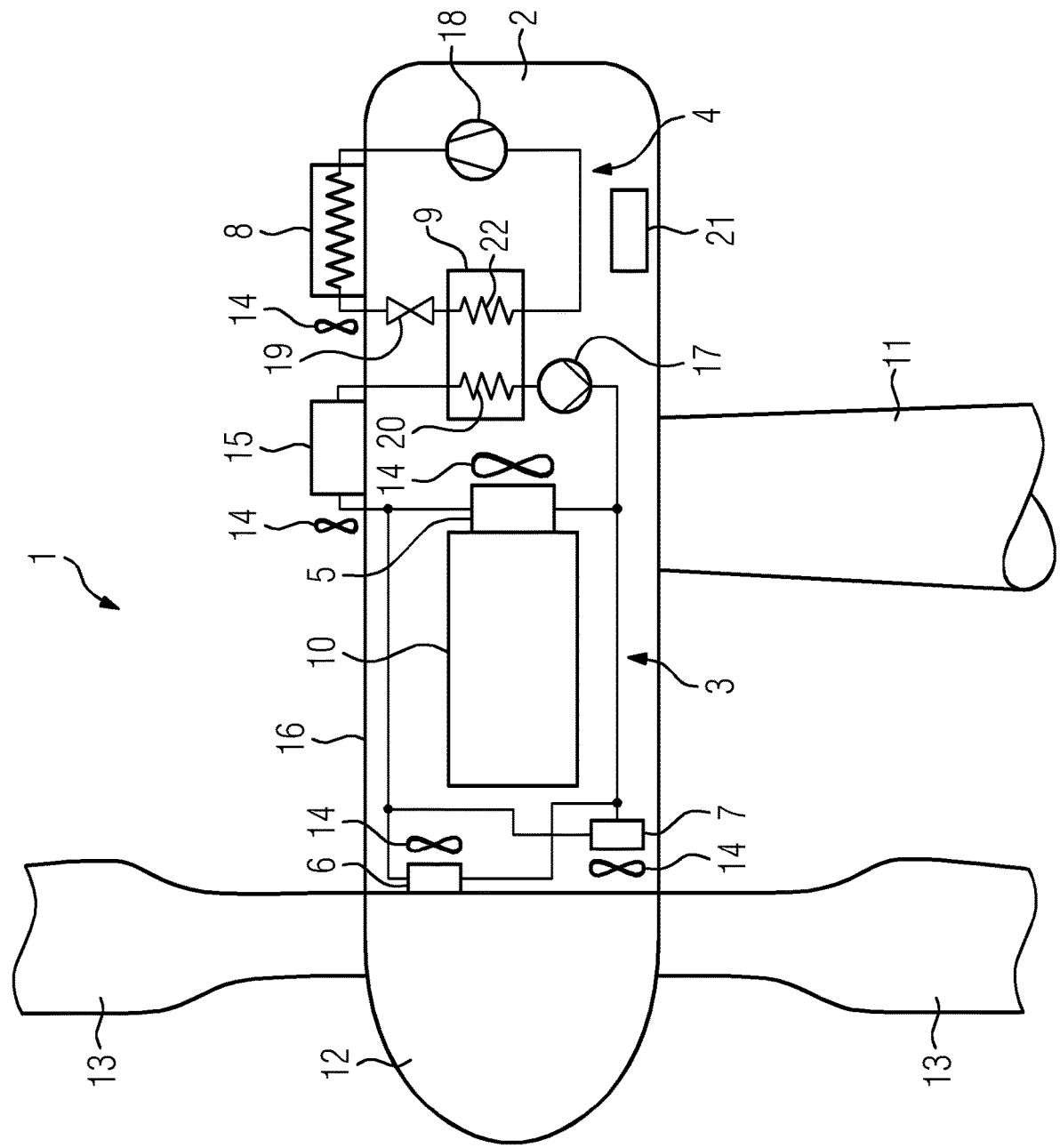

WIND TURBINE AND A METHOD FOR OPERATING A WIND TURBINE

CROSS-REFERENCE TO RELATED APPLICATION

This application claims priority to European Application No. 18181439.3, having a filing date of Jul. 3, 2018, the entire contents of which are hereby incorporated by reference.

FIELD OF TECHNOLOGY

The following relates to a wind turbine comprising a nacelle and a cooling circuit, wherein the cooling circuit comprises at least one internal cooling device within the nacelle and at least one external cooling device outside of the nacelle.

BACKGROUND

A wind turbine typically comprises a tower consisting of concrete or steel or the like. On the upper portion of the tower, particularly on the top of the tower, the nacelle is provided containing several components to convert mechanical into electrical energy. Adjacent to the nacelle is a rotor and a hub, respectively, provided, wherein the rotation of the rotor and the rotor blades is powered by the wind blowing along the wind turbine. The rotational energy of the rotor blades is transferred to the generator via an axle connecting the generator, where it is converted into electrical energy.

Since the typical capacity of wind turbines regarding the power generation becomes larger and larger, more effective cooling systems are required to cool down the components of the wind turbines. Especially heat generated by mechanical friction and/or the energy converting process has to be disposed from the interior of the nacelle or an engine house, respectively.

Known cooling systems for wind turbines provide a cooling circuit comprising at least one internal cooling device to absorb heat from the interior of the nacelle or a component of the wind turbine which is located inside of the nacelle. An external cooling device located outside of the nacelle of the cooling circuit is further provided to emit the heat from the cooling circuit into the ambient air.

The problem on which embodiments of the present invention is based on is to provide an easy way to enhance the cooling power of the cooling system.

SUMMARY

To solve this problem a wind turbine as depicted above is characterized in that a heat exchanging device coupling the cooling circuit with a second cooling circuit is provided, wherein the second cooling circuit comprises a further external cooling device outside of the nacelle.

To remove heat from the inside of the nacelle, the internal cooling device transfers the heat to be removed into the cooling circuit. This heat is transferred to the ambient air via two different branches. In the first branch, the external cooling device of the cooling circuit emits heat into the ambient air. However, as described above, in many cases this branch alone is not sufficient to provide enough cooling capacity of the cooling system. Therefore, in the second branch the heat exchanging device coupling the two cooling circuits transfers heat from the cooling circuit to the second cooling circuit, where it is transferred into the ambient air by the further external cooling device of the second cooling circuit. Therefore, the greatest possible amount of heat transferred from the inside of the nacelle into the ambient air by the cooling system is increased by providing the heat exchanging device coupling the two cooling circuits. The enhanced cooling capacity of the cooling system provides a more effective cooling of the interior of the nacelle and/or the components located inside the nacelle.

In addition to this benefit, there is the advantage that an already existing cooling system comprising the cooling circuit can be upgraded easily by mounting the second cooling circuit and coupling the two cooling circuits by the heat exchanging device. Therefore, a redesign or a rebuild of the cooling circuit is not necessary for this upgrade. The already existing cooling system is rather expanded.

In preferred embodiments of the invention the second cooling circuit comprises a compressor, an expansion valve, and an evaporator, wherein the evaporator is thermally coupled to or a part of the heat exchanging device, wherein the further external cooling device is a condenser. In embodiments of the invention the second cooling circuit works in the same way as a refrigeration machine. In this embodiment, even at high temperatures, a sufficient cooling is ensured. The evaporator may be a helical tube section connected to another helical tube section of the cooling circuit by the heat exchanging device.

It has to be mentioned that the second cooling circuit may provide only a pump and the further external cooling device, in particular a heat emitter. In this case the second cooling circuit does not work like a refrigerator but also transfers heat into the ambient air.

The heat exchanging device may be located upstream or downstream with respect to the external cooling device in the cooling circuit. The cooling circuit may comprise a pump circulating a cooling fluid like water or oil or the like. In the first variant, when in the cooling circuit the heat exchanging device is located downstream with respect to the external cooling device, initially the cooling fluid flows through the internal cooling device where it is heated. Next, the cooling fluid reaches the external cooling device, where it is cooled down. Finally, it is cooled down again by the heat exchanging device where heat is transferred to the second cooling circuit. After this, the cycle starts from the beginning.

However, there is also a second variant possible, where the positions of external cooling device and the heat exchanging device in the cooling circuit are switched compared to the first variant.

Both variants can be advantageous. In particular, the cooling efficiencies of both cooling circuits may depend on an outside temperature or, in other words, the temperature of the ambient air as well as on the respective temperature of the cooling fluid. This can be used to determine a total efficiency of the cooling system for both variants with respect to, e.g., an annual average temperature of the ambient air. Finally, the better variant can be realized.

In embodiments of the invention the external cooling device and/or the further external cooling device is mounted on a canopy of the nacelle. The canopy of the nacelle protects the inside of the nacelle against humidity, solar radiation or other disturbing influences from outside. The external cooling device and/or the further external cooling device may be mounted on top of the nacelle or the canopy, respectively. In this case, the heat exchange by wind of the ambient air is optimal, because the heat exchange is not constrained by a wind shadow of the tower or the like. Thus, an optimal flow of the ambient air with respect to the external cooling devices is reached. To improve the heat exchange further, it is possible to provide external cooling fans to blow ambient air onto the external cooling devices.

The heat exchanging device may be located within the nacelle. However, since the external cooling device is located outside of the nacelle and therefore the pipelines of the cooling circuit also run partly outside of the nacelle, the heat exchanging device may also be located outside of the nacelle as well as further components of the second cooling circuit.

An advantage of this embodiment is that the cooling capacity might be improved, because of the cooling of the components of the second cooling circuit located outside of the nacelle by the ambient air.

In embodiments of the invention a control device is provided, wherein the control device is configured to control the operation of the second cooling circuit with respect to a temperature information. This offers the advantage, that the operation of the second cooling circuit can be controlled with respect to operating conditions of the first cooling circuit. In particular, a capacity overload of the cooling circuit can be prevented by adjusting the operating parameters of the second cooling circuit. Furthermore an efficiency factor of the cooling system can be determined by, e.g., suitable models considering the temperature information and, for example, other operation parameters of the cooling system. The control of the operation of the second cooling circuit can be done to optimize the efficiency factor.

The temperature information may describe the temperature of the air inside and/or outside of the nacelle and/or the temperature of a cooling fluid of the cooling circuit and/or the operating temperature of at least one component of the cooling circuit and/or the wind turbine. These temperatures influence the operation of the cooling system, hence, are useful for the control of the operation of the second cooling circuit.

These temperatures may be achieved by temperature sensors located on the components, whose temperature has to be measured. Furthermore, the temperature sensors may be located inside and/or outside of the nacelle to measure the temperature of the internal air of the nacelle and/or the temperature of the ambient air. In this embodiment the operating conditions, in particular the cooling capacity, of the second cooling circuit may be controlled with respect to the temperature information.

In case that the temperature, for example the temperature of the cooling fluid of the cooling circuit, exceeds a defined critical maximum value, the second cooling circuit may be started by, e.g., starting the compressor or a pump of the second cooling circuit. Accordingly, if the temperature of the cooling fluid of the cooling circuit falls below the critical maximum value, the operation of the second cooling circuit may be stopped. The defined critical maximum value may correspond to the greatest possible cooling capacity of the cooling system without having the second cooling circuit in operation. The greatest possible cooling capacity of the cooling system may also depend on further conditions like the temperature of the ambient air.

In more sophisticated embodiments of the invention, the amount of the cooling power of the second cooling circuit can be controlled continuously. Depending on a determined difference between the required cooling power and the cooling power provided by the cooling circuit, the cooling power provided by the second cooling circuit can be regulated. This can be achieved by regulating the operating power of the compressor or the pump of the second cooling circuit. A required cooling capacity of the cooling system and/or the second cooling circuit may be computed based, for example, on models or empirical data.

Additionally, the operation of the second cooling circuit may be controlled with respect to predicted information describing an expected power requirement of the wind turbine and/or the weather forecast and/or the like. In this embodiment, the cooling power can be increased already in advance, if an increase of the energy to be provided by the wind turbine and/or an increase of the temperature of the ambient air caused by weather conditions is imminent.

The cooling device may be configured to cool the generator of the wind turbine or the hub of the wind turbine. A heating of the generator occurs due to the conversion process of the mechanical into electrical energy, but also because of friction caused by the rotation of components of the generator. This heat can be transferred into the cooling circuit by the internal cooling device, which can be a heat exchanging device being directly in contact with the generator. Additionally or alternatively, the generator can be cooled indirectly. In this case the internal cooling device may cool the inside air of the nacelle. Instead of the generator, the internal cooling device can alternatively cool other components of the wind turbine located inside the nacelle, like the hub of the wind turbine producing heat by friction caused by the rotation of this component.

In embodiments of the invention, the internal cooling device is configured to cool the generator of the wind turbine and a second internal cooling device of the cooling circuit is configured to cool the hub of the wind turbine. In this embodiment two internal cooling devices are provided within the cooling circuit to remove heat from the generator and the hub. In this embodiment, heat is transferred into the cooling system right at the position, where the heating occurs. Hence, the cooling effect of the cooling system is further improved. It is understood to expand the cooling circuit by further internal cooling devices to remove heat from further components located within the nacelle.

The internal cooling device of the cooling circuit may be an internal heat exchanging device transferring heat from a component of the wind turbine located within the nacelle into the cooling circuit. As already mentioned, the heat transfer can occur via a thermal coupling or contact, respectively, between the internal cooling device and the component. Additionally or alternatively, the internal cooling device of the cooling circuit may cool the air inside the nacelle, wherein a cooling fan may be provided to distribute the cooled air in the interior of the nacelle. It is also possible to use the fan or further fans to blow air cooled by the internal cooling device onto the component to be cooled, in particular if the internal cooling device and the component to be cooled are not in direct thermal contact with each other.

Furthermore, embodiments of the present invention relate to a method for operating a wind turbine as described above, wherein a control device controls the operation of the second cooling circuit with respect to a temperature information.

In this method the temperature information describes the temperature of the air inside and/or outside the nacelle and/or the temperature of a cooling fluid of the cooling circuit and/or the operating temperature of at least one component of the cooling circuit and/or the wind turbine.

All features of the wind turbine according to embodiments of the present invention and the explained advantages can be transferred to the method according to embodiments of the present invention.

BRIEF DESCRIPTION

Some of the embodiments will be described in detail, with references to the following Figures, wherein like designations denote like members, wherein:

The FIGURE shows a schematic view of a wind turbine according to embodiments of the present invention.

DETAILED DESCRIPTION

The wind turbine 1, as shown in FIG. 1, comprises a nacelle 2, a cooling circuit 3 and a second cooling circuit 4. The cooling circuit 3 comprises an internal cooling device 5, an optional second internal cooling device 6, an optional third internal cooling device 7 and an external cooling device 15. The second cooling circuit 4 comprises a further external cooling device 8 outside of the nacelle 2. The cooling circuit 3 is coupled with the second cooling circuit 4 by a heat exchanging device 9. Both cooling circuits 3, 4 comprise water or oil or the like as a cooling fluid.

Known cooling systems for wind turbines basically comprise only the cooling circuit 3. An upgrade of such a system to achieve a wind turbine according to embodiments of the present invention can be done quite easily by providing the second cooling circuit 4. For this purpose, the second cooling circuit 4 has to be installed and linked with the cooling circuit 3 via the heat exchanging device 9. In particular, the cooling circuit 3 must not be rebuild if an upgrade in the sense of embodiments of the invention is intended.

Another advantage of embodiments of the present invention is that the second cooling circuit 4 allows to expel heat from the inside of the nacelle 2 into the ambient air not only by the external cooling device 15, but also by the second cooling circuit 4 or the further external cooling device 8, respectively. Hence, the maximum possible cooling power of the cooling system of the wind turbine 1 is increased significantly compared to cooling systems comprising only cooling circuit 3.

A generator 10 is located within the nacelle 2 placed on top of the concrete tower 11 of the wind turbine 1. The generator 10 converts mechanical into electrical energy, wherein the mechanical energy is provided by a hub 12 connected to a drive axle (not shown in the FIGURE) of the generator 10. The rotation of the hub 12 is caused by wind of the ambient air propelling rotor blades 13 attached to the hub 12.

The internal cooling device 5 is provided to cool the generator 10 of the wind turbine 1. The second internal cooling device 6 of the cooling circuit 3 is supposed to cool the hub 12, wherein the heating of hub 12 is caused by friction concerning the rotational motion of the hub 12. The third internal cooling device 7 is provided to cool the air inside the nacelle 2. Thus, the cooling effect of the third internal cooling device 7 affects also other components inside of the nacelle 2 indirectly. The internal cooling devices 5-7 are heat exchanging devices to absorb heat from the components to be cooled. To improve the heat exchanging process, cooling fans 14 can be provided for each internal cooling device 5-7. It has to be mentioned that, according to embodiments of the invention, the cooling circuit 3 may comprise only one internal cooling device 5 cooling any arbitrary component inside the nacelle 2.

The external cooling device 15 of the cooling circuit 3 is located on top of a canopy 16 of the nacelle 2. The external cooling device 15 transfers heat from the cooling circuit 3 into the ambient air outside of the nacelle 2. It is possible to provide another cooling fan 14 to improve the heat exchange of the external cooling device 15 with the ambient air. To circulate the cooling fluid of the cooling circuit 3, a pump 17 is provided.

The second cooling circuit 4 comprises the further external cooling device 8, which is also mounted on the canopy 16, a compressor 18 and an expansion valve 19. Basically, the second cooling circuit 4 operates on the same principle as a refrigerator. Another cooling fan 14 may be provided to improve the heat exchange between the further external cooling device 8 and the ambient air. The heat exchanger 9 transfers heat from the cooling circuit 3 to the cooling circuit 4. For this purpose, the cooling circuit 3 comprises for example a helical tube section 20 and the second cooling circuit 4 comprises for example an evaporator 22, which is also a helical tube section, wherein the helical tube sections 20, 22 are thermally coupled to each other by the heat exchanging device 9. It is also possible that the helical tube sections 20, 22 and the heat exchanging device 9 are provided as one single component connecting the cooling circuits 3, 4. In embodiments of the invention, the helical tube section 20 or the heat exchanging device 9 is located downstream in the cooling circuit 3 with respect to the external cooling device 15. It has to be mentioned that the helical tube section 20 or the heat exchanging device 9 may also be located upstream in the cooling circuit 3 with respect to the external cooling device 15.

The wind turbine 1 furthermore comprises a control device 21, which is configured to control the operation of the second cooling circuit 4 with respect to a temperature information. For clarity the wires between the control device 21 and other components are not shown in the FIGURE.

To achieve the temperature information, the control device 21 is connected to several sensors (not shown in the FIGURE) measuring the temperature of the generator 10, the hub 12, the air inside the nacelle 2, the ambient air outside of the nacelle 2 and the cooling fluid within the cooling circuit 3.

In a basic operation mode of the cooling system, the second cooling circuit 4, in particular the compressor 18, is switched off. Thus, heat is released from the cooling circuit 3 only by the external cooling device 15. In particular, essentially no heat transfer from the cooling circuit 3 to the second cooling circuit 4 occurs in the basic operation mode. In this case the cooling of the cooling system is provided by the cooling circuit 3 only.

In a boost operation mode of the cooling system, the second cooling circuit 4, in particular the compressor 18, is switched on controlled by the control device 21. Thus, heat is released from the cooling circuit 3 by the external cooling device 15 expelling heat into the ambient air as well as by the heat exchanging device 9 transferring heat towards the second cooling circuit 4. The maximum cooling capacity in the boost operation mode is significantly larger than the maximum cooling capacity in the basic operation mode of the cooling system.

Based on the measured data, the control device 21 may control the operation of the second cooling circuit 4 only by considering the temperature of the cooling fluid of the cooling circuit 3. Another possibility to control the operation of the second cooling circuit 4 is that the control device 21 calculates an expected or required cooling power for the cooling system. For this purpose, models and/or empirical data can be used. In case that the expected cooling power exceeds the largest possible cooling capacity in the basic operation mode, the cooling system runs in the boost operation mode. Otherwise, the cooling system runs in the basic operation mode. The control device 21 is configured to generate appropriate signals for this purpose controlling the second cooling circuit 4 or the compressor 18, respectively.

In the boost operation mode, the cooling power of the second cooling circuit 4 can for example be regulated with respect to the difference between the expected cooling power and the maximum possible cooling power of the cooling system in the basic operation mode. The larger the difference is, the higher the cooling power of the cooling circuit 4 is adjusted. This regulation is done by adjusting the operating power of the compressor 18 of the second cooling circuit 4.

Since heat is emitted essentially into the ambient air via the external cooling device 15, the maximum cooling power or capacity of the cooling system in the basic operation mode depends on the surrounding temperature or, in other words, on the temperature of the ambient air. The calculation of the maximum cooling capacity of the basic operation mode by the control device 21 furthermore considers the temperature of the ambient air. This means that the operation of the second cooling circuit 4 happens in particular with respect to the weather and/or the seasons of the year and/or the location of the wind turbine.

In addition, predicted data as an expected power to be generated by the wind turbine 1 or the weather forecast can also be considered for controlling the operation of the second cooling circuit 4. For example, if an increase of the expected power to be generated is detected by, e.g., fluctuations in the power grid, more heat produced by the generator 10 must be expected. In this case, the cooling power can be increased already before this event to cool down the temperature level in the nacelle 2.

Although the present invention has been disclosed in the form of preferred embodiments and variations thereon, it will be understood that numerous additional modifications and variations could be made thereto without departing from the scope of the invention For the sake of clarity, it is to be understood that the use of "a" or "an" throughout this application does not exclude a plurality, and "comprising" does not exclude other steps or elements.

The invention claimed is:

1. A wind turbine comprising:
a nacelle; and
a cooling circuit, wherein the cooling circuit comprises at least one internal cooling device within the nacelle and at least one external cooling device outside of the nacelle;
wherein a heat exchanging device coupling the cooling circuit with a second cooling circuit is provided; wherein the second cooling circuit is a closed circuit; and wherein the second cooling circuit comprises a further external cooling device outside of the nacelle.

2. The wind turbine according to claim 1, wherein the second cooling circuit comprises a compressor, an expansion valve, and an evaporator, wherein the evaporator is thermally coupled to or a part of the heat exchanging device, wherein the further external cooling device is a condenser.

3. The wind turbine according to claim 1, wherein the heat exchanging device is located upstream or downstream with respect to the at least one external cooling device in the cooling circuit.

4. The wind turbine according to claim 1, wherein the at least one external cooling device and/or the further external cooling device is mounted on a canopy of the nacelle.

5. The wind turbine according to claim 1, wherein a control device is provided, wherein the control device is configured to control an operation of the second cooling circuit with respect to a temperature information.

6. The wind turbine according to claim 5, wherein the temperature information describes a temperature of air inside and/or outside of the nacelle and/or a temperature of a cooling fluid of the cooling circuit and/or an operating temperature of at least one component of the cooling circuit and/or the wind turbine.

7. The wind turbine according to claim 1, wherein the at least one internal cooling device is configured to cool a generator of the wind turbine or a hub of the wind turbine.

8. The wind turbine according to claim 1, wherein the at least one internal cooling device is configured to cool a generator of the wind turbine and a second internal cooling device of the cooling circuit is configured to cool a hub of the wind turbine.

9. A method for operating a wind turbine, comprising:
providing wind turbine comprising:
a nacelle; and
a cooling circuit, wherein the cooling circuit comprises at least one internal cooling device within the nacelle and at least one external cooling device outside of the nacelle;
wherein a heat exchanging device coupling the cooling circuit with a second cooling circuit is provided; wherein the second cooling circuit is a closed circuit; and wherein the second cooling circuit comprises a further external cooling device outside of the nacelle, and
controlling, by a control device, an operation of the second cooling circuit with respect to a temperature information.

10. The method according to claim 9, wherein the temperature information describes a temperature of air inside and/or outside the nacelle and/or a temperature of a cooling fluid of the cooling circuit and/or an operating temperature of at least one component of the cooling circuit and/or the wind turbine.

* * * * *